US007146715B2

(12) United States Patent
Villanueva

(10) Patent No.: US 7,146,715 B2
(45) Date of Patent: Dec. 12, 2006

(54) SPIN PRESSURE POWER TOOL

(75) Inventor: Ramon Cruz Villanueva, Palmdale, CA (US)

(73) Assignee: AVK Industrial Products, Valencia, CA (US)

( * ) Notice: Subject to any disclaimer, the term of this patent is extended or adjusted under 35 U.S.C. 154(b) by 123 days.

(21) Appl. No.: 10/911,347

(22) Filed: Aug. 3, 2004

(65) Prior Publication Data

US 2006/0026812 A1 Feb. 9, 2006

(51) Int. Cl.
*B23P 21/00* (2006.01)
*B23P 11/00* (2006.01)
*B23Q 17/00* (2006.01)

(52) U.S. Cl. ..................... 29/709; 29/714; 29/243.521; 29/243.523; 29/243.53; 29/407.01; 29/407.02; 29/407.08; 29/524.1; 173/180; 173/181; 72/391.2

(58) Field of Classification Search ............ 29/243.53, 29/524.1, 525.06, 407.08, 407.01, 407.02, 29/407.05, 509, 522.1, 525.05, 709, 714, 29/243.5, 243.521, 243.523; 173/8, 177, 173/180, 181; 72/391.2, 391.4
See application file for complete search history.

(56) References Cited

U.S. PATENT DOCUMENTS

| | | | | |
|---|---|---|---|---|
| 2,423,957 | A * | 7/1947 | Amtsberg | 72/358 |
| 2,583,733 | A * | 1/1952 | Fischer et al. | 72/114 |
| 3,181,338 | A * | 5/1965 | Zetterlund | 72/391.8 |
| 3,686,915 | A * | 8/1972 | Miller et al. | 29/243.519 |
| 3,773,117 | A * | 11/1973 | Dussel | 173/4 |
| 3,791,459 | A * | 2/1974 | Workman, Jr. | 173/177 |
| 4,294,110 | A * | 10/1981 | Whitehouse | 73/862.23 |
| 4,321,814 | A * | 3/1982 | Martin | 72/114 |
| 5,421,240 | A * | 6/1995 | Ohta et al. | 91/59 |
| 6,240,613 | B1 * | 6/2001 | O'Connor et al. | 29/407.01 |
| 6,487,767 | B1 * | 12/2002 | Reid et al. | 29/522.1 |
| 6,851,167 | B1 * | 2/2005 | Harlow et al. | 29/407.01 |
| 6,990,722 | B1 * | 1/2006 | Reid et al. | 29/522.1 |

FOREIGN PATENT DOCUMENTS

EP 119007 A2 * 9/1984

OTHER PUBLICATIONS

Instruction and Maintenance Manual—AVK Power Installation Tooling, Cat. No. 213M, Apr. 3, 1995, Valencia, California.

* cited by examiner

*Primary Examiner*—Jermie E. Cozart
(74) *Attorney, Agent, or Firm*—Greenberg Traung, LLP; Louis J. Bovasso, Esq.

(57) ABSTRACT

Apparatus for installing a rivet nut or the like having an intentionally threaded shaft wherein the apparatus includes a hydraulically geared power tool having an inner hydraulic fluid containing a chamber and a screw adapted to engage the threaded shaft of the nut wherein the power tool rotates the screw when actuated. A fluid outlet is coupled to the chamber and is coupled to a gauge controlled power supply, the power supply being fluidly coupled to the power tool whereby the power supply includes torque predetermining device for determining when a predetermined torque is placed on the screw, this stopping rotation thereof and resuming rotation in an opposite direction to withdraw the screw from the nut.

7 Claims, 7 Drawing Sheets

SPIN PRESSURE POWER TOOL

BACKGROUND OF THE INVENTION

1. Field of the Invention

The invention relates to power tool apparatus; and, more particularly, to a hydraulically actuated power tool and related apparatus used to install a rivet nut in a panel or the like.

2. Related Art

Power tools have been used for years to install rivet nuts in panel assemblies. The Aro Corporation of City of Industry, California manufactures and sells power installation tools for installing threaded inserts, such as rivet nuts, in panels or the like.

Convention power tools rotate to install such nuts but break off the shafts of such nuts during installation. Other such tools require measurement of the shaft of the nut during installation, then adjustment of the power tool.

There is a need for apparatus to install rivet nuts wherein, when a predetermined torque is reached during installation, the rotating tip of the power tool stops, then reverses rotation to unscrew the tip from the nut.

SUMMARY OF THE INVENTION

It is an object of this invention to provide spin pressure power tool apparatus for installing rivet nuts.

It is a further object of this invention to provide such apparatus wherein a predetermined pressure can be set and the tip of the tool stops when such pressure is reached.

These and other objects are preferably accomplished by providing apparatus for installing a rivet nut or the like having a threaded shaft.

The apparatus includes a hydraulic geared power tool having an inner hydraulic fluid containing chamber and a screw adapted to engage the threaded shaft of the nut wherein the power tool rotates the screw when actuated. A fluid outlet is coupled to the chamber and coupled to a gauge controlled power supply, the power supply being fluidly coupled to the power tool whereby the power supply determines when a predetermined torque is placed on the screw. Rotation of the screw is stopped, then thereof and resumes rotation in an opposite direction to withdraw the screw from the nut.

DESCRIPTION OF THE PREFERRED EMBODIMENT

Figure 1:
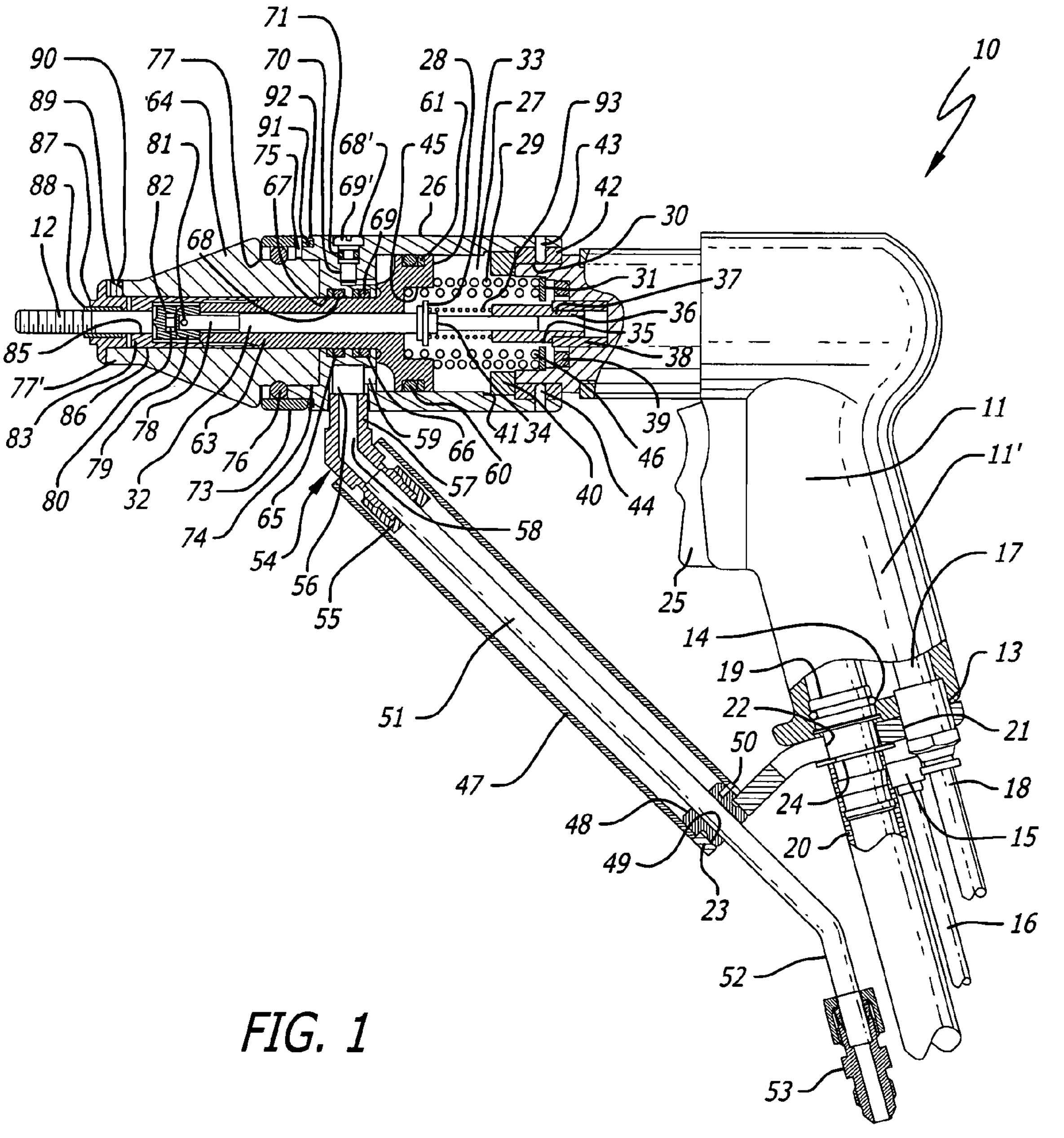
FIG. 1 is an elevational view, partly in section, of the installation tool of the total assembly.

Referring now to FIG. 1 of the drawing, a power tool 10 is shown which forms part of the apparatus of the invention. Tool 10 includes a handle portion encompassed by housing 111 which internally includes components manufactured and sold by Aro Corp., of Bryan, Ohio. Tool 10 is adapted from the air motor operated tools made by Aro Corp. Two such tools are Aro Model No. 8519 (pistol grip shown in FIG. 1) and Aro Model no. 7359E1 (lever style to be discussed further hereinbelow). Thus, housing 11, except as herein discussed, internally houses components made by Aro Corp. to pneumatically rotate head cap screw 12 of tool 10. Such internal equipment in housing 11 includes the head section, motor section, and gearing section of tool 10 and forms no part of the invention other than as modified herein and in the environment set forth.

Thus, again referring to FIG. 1, a threaded hole 13 is tapped into the interior of housing 11 providing fluid communication with hydraulic fluid chamber 11', a conventional part of Aro housing 11, and shown in dotted lines. A conventional pneumatic fitting 15 is threaded into hole 13 coupled to a trigger signal line 16 which, as will be discussed, is coupled to fitting 100 (FIG. 2).

Figure 2:
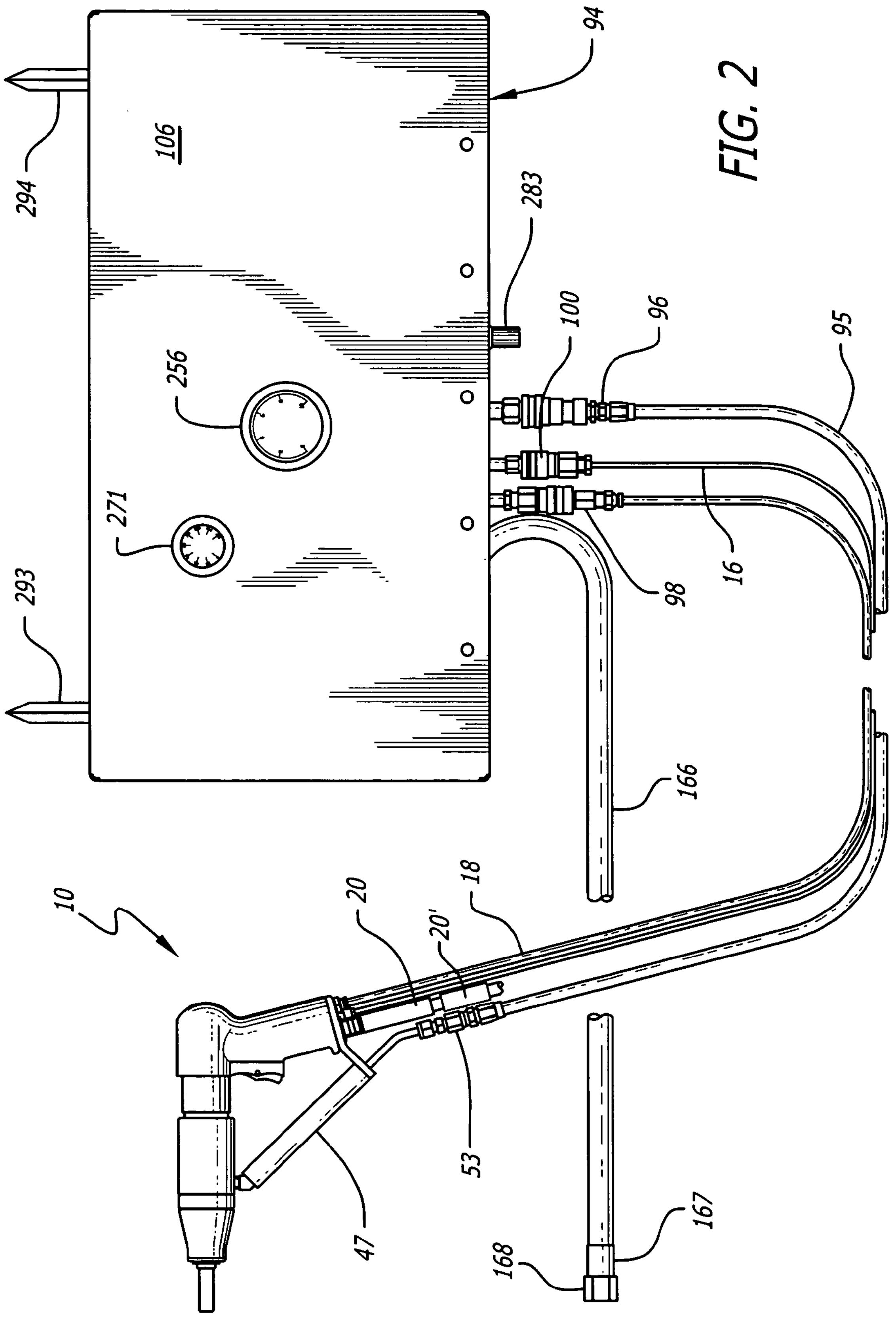
FIG. 2 is an elevational view of the spin pressure power tool apparatus of the invention.

Housing 11 also includes a conventional pneumatic fitting 17, FIG. 1, communicating with the interior of housing 11, coupled to hydraulic tubing 18 which, as will be discussed, is coupled to fitting 98 (FIG. 2). Housing 11 also includes a conventional exhaust stem 19 (FIG. 1) coupled to exhaust tubing 20. Both fitting 17 and stem 19 are mounted in apertures 21, 22, respectively, in a mounting plate 23 and retained thereto by a retaining ring 24.

Tool 10 is trigger operated by a rocker trigger 25 internally coupled to the valve stems (not shown) operatively coupled to the internal motor (not shown) of tool 10 within housing 11. If desired, the internal mechanism of housing 11 may be lever operated as provided in Aro Corp.'s lever-style power installation tool Model No. 7359E1. Rocker trigger 25 may rotate the cap screw 12 in a forward or clockwise direction when in one position, as the "up" position, and rotate cap screw 12 in the reverse or counterclockwise direction when in the other or "down" position, as will be discussed.

Cylindrical housing 26 is mounted to rear housing 11 and includes an internal chamber 27. A piston 28 is reciprocally mounted within chamber 27. A spring 29 is disposed between piston 28 and a stop 40 mounted in chamber 27. A washer 30 is mounted within chamber 27 between stop 40 and shoulder 31. Washer 30 is stopped in its rearward direction by abutment with a shoulder 31. A shaft 32 extends through the middle of piston 28 rearwardly through a washer 33 retained to shaft 32 by a roll pin 34 then rearwardly to a hex portion 35 mounted in extension 36 having a reduced neck portion 37 rotatably mounted in the rotatable portion 38 of thrust bearing assembly 39. A stop 40 is provided in chamber 27 abutting at its forward end against a shoulder 41 on the inner wall of chamber 27 and at its rear abutting against an adapter 42 at the terminal end of housing 26 retained therein by groove pins 43, 44. A spring 93 is encircles shaft 32 abutting at one end against washer 33 and at the other end against hex portion 35.

Piston 28 has a cavity 45 with a spring 46 mounted in cavity 45 surrounding shaft 32 and abutting at its rear end against shoulder 31.

An outer tube 47 is mounted to mounting plate 23 by means of an apertured guide 48 extending into an opening 49 in plate 23 receiving tube 47 thereon. A groove pin 50 retains tube 47 to guide 48 angled portion 52 having a conventional quick release hydraulic fitting 53 at the terminal end thereof coupled to fitting 96 (FIG. 2). Tubes 47 and 51, extending through outer tube 47, are coupled (FIG. 1) to housing 26 by means of an elbow 54 having a spring biased portion 55 mounted inside of the upper end of tube 47 receiving tube 51 therethrough. Tube 51 has an elbow 54 is threadably mounted at its upper end 56 in a threaded opening 57 in housing 26. Tube 51 has an angled upper portion 58 coupled thereto mounted in end 56 opening into communication with a fluid inlet 59 communicating with the interior of chamber 27. A conventional O-ring 60 surrounds piston 28 mounted in an annular groove 61 therein.

Piston 28 has a forward reduced neck portion 63 extending to and through a forward housing 64 detachably mounted to housing 26 as will be discussed. A pair of grooves 65, 66 are provided in the inner wall 67 of housing 26 surrounding piston portion 63. A conventional O-ring 68 is mounted in groove 65 and a conventional backing ring 69 is mounted in groove 66, both encircling piston neck portion 63.

A set screw 68' having a slotted head 69' is mounted in a stepped opening 70 in housing 26. A conventional O-ring 71 surrounds the reduced neck portion 72 of screw 68'.

A quick release sleeve 73 encircles a reduced diameter end 74 of housing 26 retained thereto by groove pin 75. A ball bearing assembly 76 is provided in groove 77, the ball thereof engaging the interior of sleeve 23. An O-ring 91 is provided between sleeve 73 and shoulder 92 of housing 26.

Housing 64 tapers forwardly to terminal end 77'. Shaft 32 abuts against a shaft portion 78 extending into a hex-shaped nut 79 terminating in a hex head 80. A roll pin 81 retains shaft portion 78 to nut 79.

Nut 79 is disposed in a cavity 82 formed in a cover 83. A cap screw 12 extends through opening 85 in cover 83 with washer 86 surrounding the same. A hex-shaped end 87 closes off the forward end of housing 64, head cap screw 12 extending therethrough. An insert 88 is disposed between hex nose piece 87 and screw 12 encircling screw 12. Set screw 89 extends through a hole 90 in end 77' of housing 64 securing nose piece 87 thereto.

Referring now to FIG. 2, the tool 10 is coupled to a power pack 94. Fitting 53 (FIG. 1) is coupled, via tubing 95 to a quick connect fitting 96 in fluid communication with the interior of power pack 94 as well be discussed. Tubing 20 is coupled to a conventional muffler 20'. Tubing 18 extends to quick connect fitting 98 in fluid communication with the interior of power pack 94. Tubing 16 extends to quick connect fitting 100 in fluid communication with the interior of power pack 94. Suitable control dials 271, 256 to be discussed, are provided on the exterior of housing 106 of power pack 94. Also, a pair of hooks 293, 294 may also be provided connected to housing 106 of power pack 94.

Figure 3:
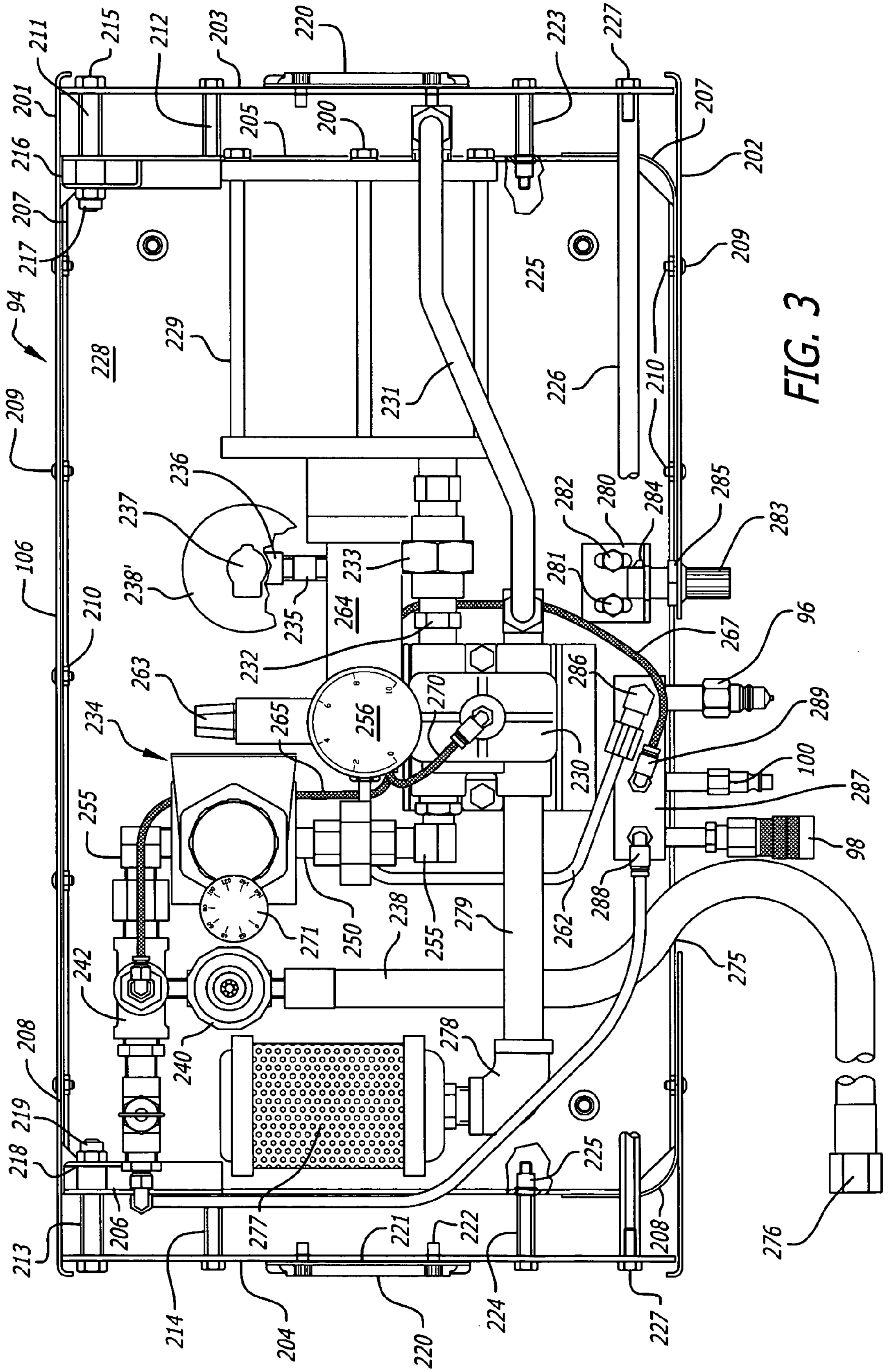
FIG. 3 is an elevational view of a portion of the apparatus of FIG. 2 showing the interior of the power pack assembly with the top plate removed for convenience of illustration.

The interior of power pack 94 is shown in FIG. 3. Power pack 94 includes a rear cover 201 and a front cover 202 with interconnecting side plates 203, 204. A pair of spaced internal partition walls 205, 206 are spaced from side walls 203, 204 respectively. Partition walls 205, 206 abut against and are supported at top and bottom by spaced hinges 207, 208, respectively, curving upwardly at the sides of partition walls 205, 206, as seen in FIG. 3. Hinges 207, 208 are bolted to cover 202 by suitable screws 209 and nuts 210.

Bushings 211, 212 interconnect partition wall 205 to side wall 203 whereas bushings 213, 214 interconnect partition wall 206 to side wall 204. Screws 215 secure the bushings to their respective side walls.

Bushing 211 extends through a hook spacer 216 with nut 217 on bushing 211 securing the spacer 216 in position. A like hook spacer 218 on the opposite side is secured in position by bushing 213 with nut 219 on bushing 213 holding spacer 218 in position. A pair of chest handles 220 are pivotally mounted on each side wall 203, 204 to hinges 221 fixed to their respective side walls by screws 222. Handles 220 pivot outwardly to enable one to carry power pack 94.

Lower bushings 223, 224 are provided between side walls 203, 204 respectively and their respective partition walls secured in place by threaded inserts 225.

A support member 226 extends along the pack 94 between walls 203, 204 spaced from front wall 202 and secured to side walls 203, 204, at each end respectively by screws 227.

It is to be understood that power pack 94 in FIG. 3 may be normally closed by a top plate (not shown) extending between rear cover 201, front cover 202, and side walls 203, 204. A back wall 228 closes off the back of power pack 94.

A conventional power booster 229 is mounted internally of power pack 94 connected to partition wall 205 by suitable nuts and bolts 200.

A conventional four-way valve 230 is also mounted internally of power pack 94 with a hollow tube 231 fluidly communicating at one end with valve 230 and at the other end with the space between partition wall 205 and side wall 203.

A male connector fitting 232 fluidly connects valve 230 to a pipe union 233 which is in turn fluidly connected to air filter, regulator and water separator apparatus 234.

Figure 4:
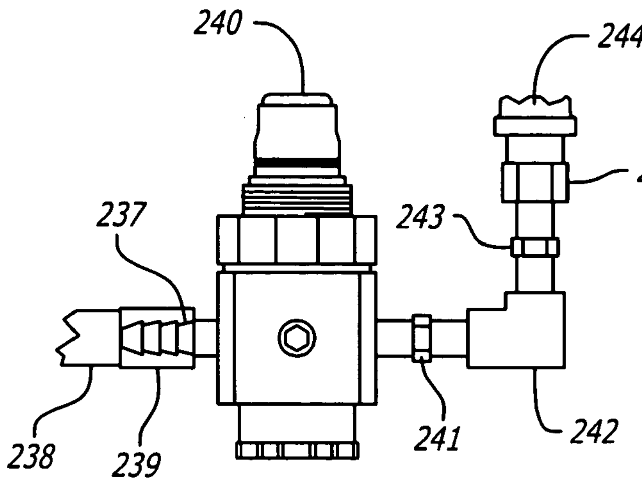
FIGS. 4 through 9 are detailed view of portions of the apparatus.

A nipple 235 is fluidly connected to apparatus 234 fluidly coupled to elbow 236 which is fluidly coupled to ferrule 239 (FIG. 4) coupled to the hose barb 237 via air house 238. Hose barb 237 extends from regulator 240 and a nipple 241 fluidly couples regulator 240 to an elbow 242 fluidly coupled to a nipple 243.

Figure 5:
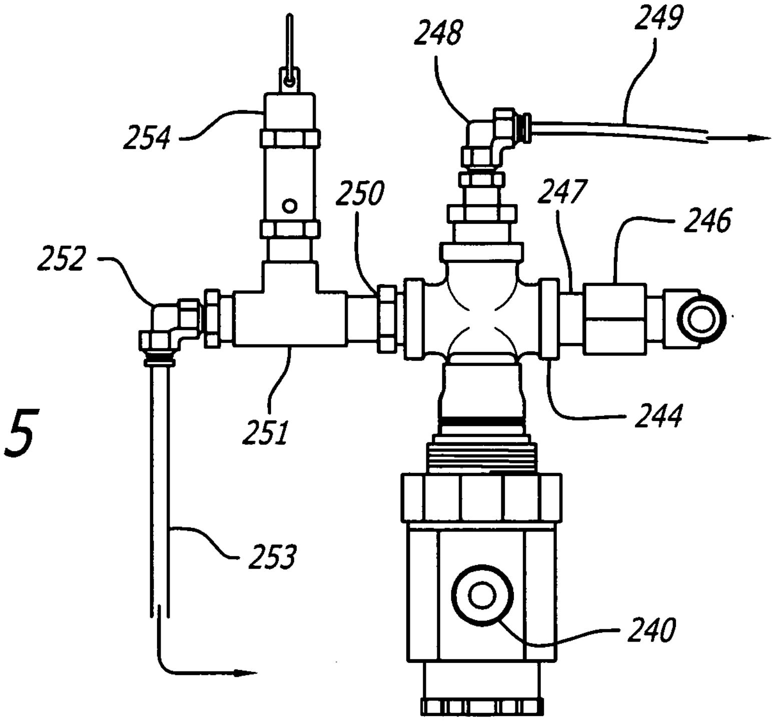

Nipple 243 is in turn fluidly coupled to a cross fitting 244 (see also FIG. 5) with bushing 245 (FIG. 4) disposed between fitting 244 and elbow 242.

Figure 6:
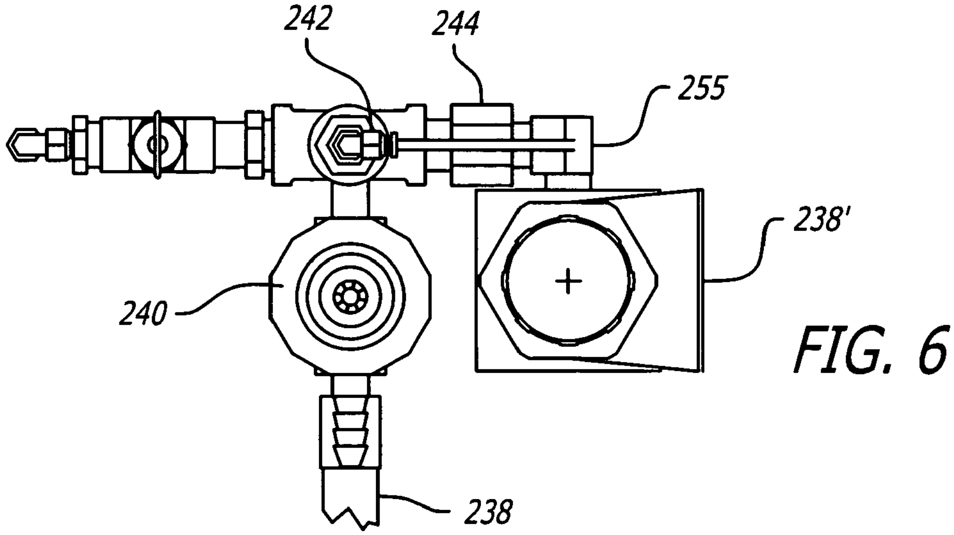

Cross fitting 244 (FIG. 5) has a nipple 247 extending from one fluid outlet coupled to reducer adapter 246. A swivel elbow 248 is fluidly coupled to another outlet of fitting 233 having tubing 249 fluidly coupled thereto. A third fluid outlet has nipple 250 fluidly coupled to a tee 251 having one outlet coupled to elbow 252 with tubing 253 in fluid communication therewith. A second outlet of tee 251 is fluidly coupled to a safety valve 254. As seen in FIG. 6, cross fitting 244 is coupled to an elbow 255 of the hydraulic fluid reservoir 238'.

Figure 7:
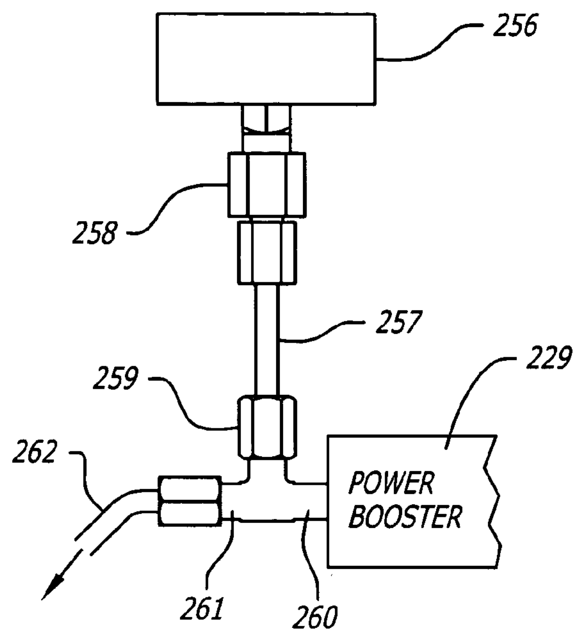

The apparatus 234 (FIG. 3) includes a liquid filled gauge 256 fluidly coupled thereto. Gauge 256 is coupled to power booster 229 (FIG. 7) by a hydraulic tubing 257 extending at one end through a connector 258 to gauge 256 and at the other end to a tee 259 having one outlet 260 coupled to power booster 229 and the other outlet 261 coupled to an hydraulic tube 262.

Figure 8:
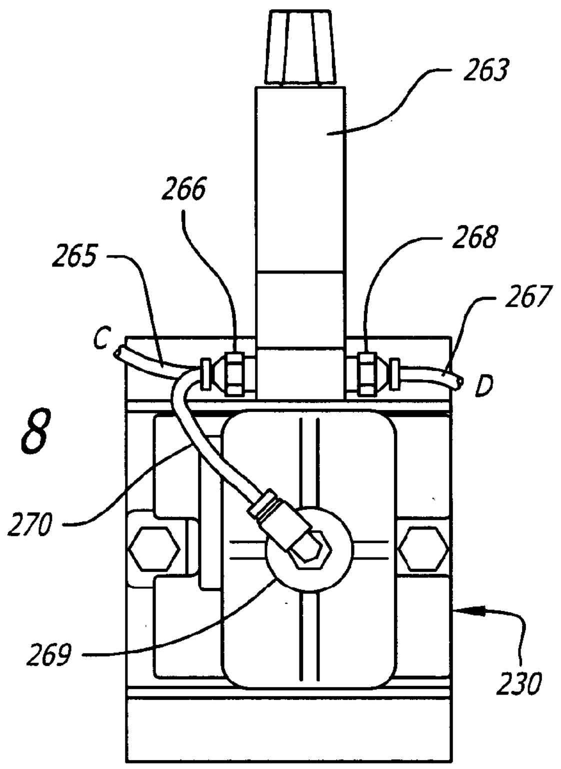

The apparatus 234 includes a trigger valve 263 (FIG. 8) coupled to a manifold 264. Tubing 265 (see also FIG. 8) is fluidly coupled to a connector 266 in fluid engagement with manifold 264. A second tubing 267 is fluidly coupled to connector 258 (FIG. 7) fluidly coupled to manifold 264. A swivel elbow 269 (FIG. 8) is fluidly coupled via tubing 270 to connector 266.

Figure 9:
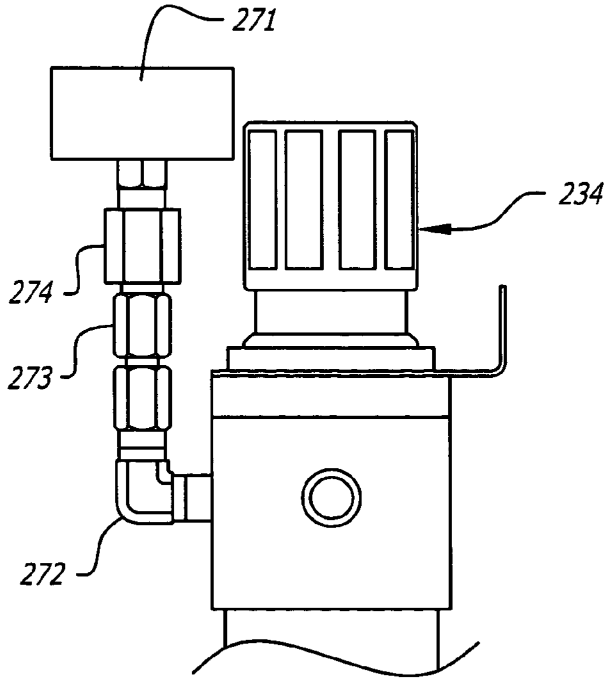

A gauge 271 (FIG. 9) is coupled to apparatus 234 via a connector 272 fluidly connected at one end to apparatus 234 and at its other end coupled to tubing 273 extending to a connector 274 fluidly coupled to air gauge 271.

Air hose tubing 238 (FIG. 4) extends from regulator 240 through an opening 275 in cover 202 to a quick connect/disconnect hose nipple 276 (FIG. 3).

A muffler 277 is coupled to an elbow 278 having a nipple 279 fluidly coupled to apparatus 234. A keeper 280 is secured to back cover 228 by suitable screw and nut assemblies 281, 282. A latch knob 283 extends from keeper 280 accessible from the exterior of front cover 202. Rotation of knob 283, coupled to front cover 202 via nut 285, releases button 284 allowing removal of cover 202.

Tubing 262 is coupled via swivel elbow 286 to a manifold 287. A like swivel elbow 289 couples tubing 267 to manifold 287. Elbow 288, coupled to tubing, is in fluid communication with a quick connect/disconnect pneumatic coupler 98 extending out of the front cover 202 of pack 94. Elbow 289 is in fluid communication with a quick connect/disconnect pneumatic nipple fitting 100 extending out of the front cover 202 of pack 94. Connection 286 is in fluid communication with a quick connect/disconnect hydraulic fitting nipple 96 extending out of the front cover 202 of pack 94.

Figure 10:
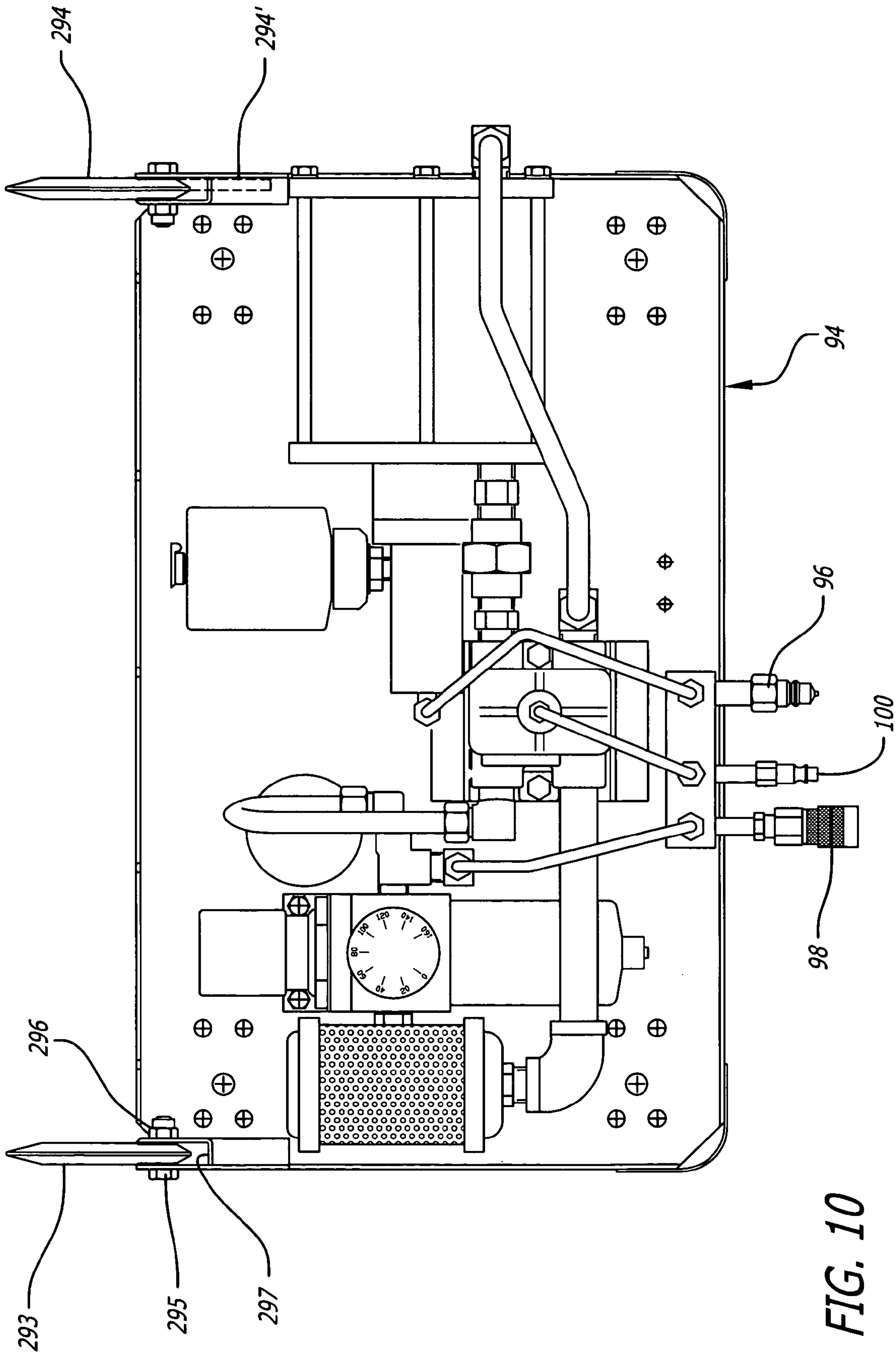
FIG. 10 is an elevational view of a modification of the apparatus of FIG. 3 showing the modification in a cutaway view.

Although a pair of carrying handles 220, 221 have been disclosed, as seen in FIG. 10, a pair of hooks 293, 294 may be provided for hanging power pack 200 on a supporting structure. Thus, each hook 293, 294 is pivotally connected via hex screw 295 and hex nut 296 between their respective outer side wall and an internal L-shaped flange 297 so that each hook 293, 294 may be pivoted to the position shown in FIG. 10 for hooking the pack 94 on a supporting structure, then pivot the same back into pack 94 as seen in the dotted line position 294'.

It is to be understood that air hose connector 276 (FIG. 3) is adapted to be coupled to a suitable source of air (not shown).

Figure 11:
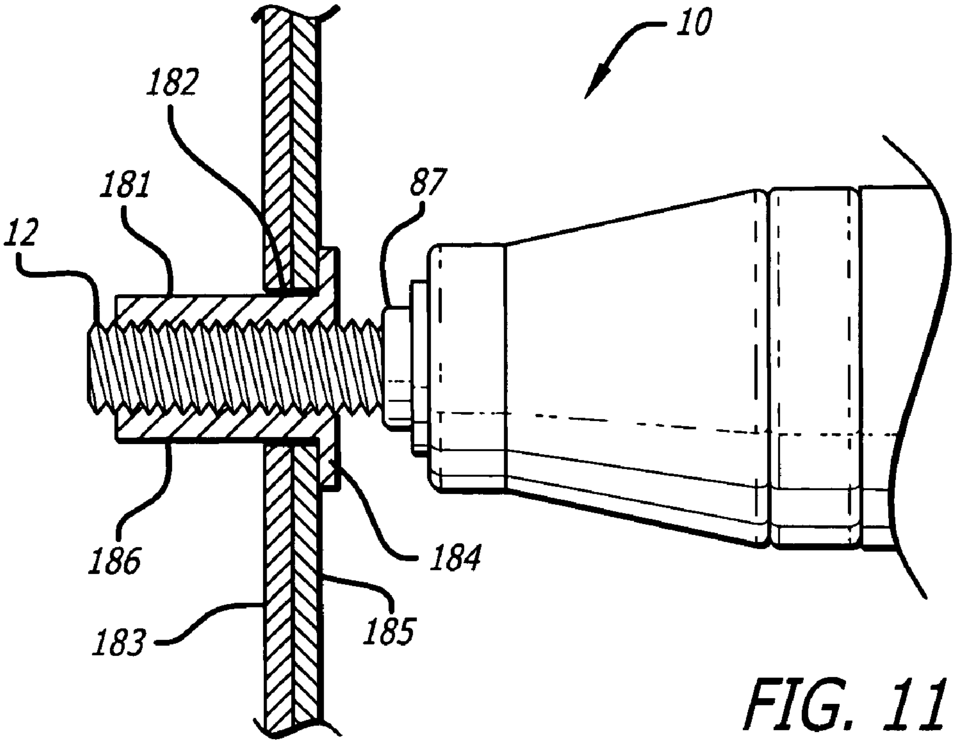
FIGS. 11 and 12 are views showing a portion of the tool of FIG. 1 used to install a conventional rivet nut, shown partly in cross-section, using the apparatus of the invention.
Figure 12:
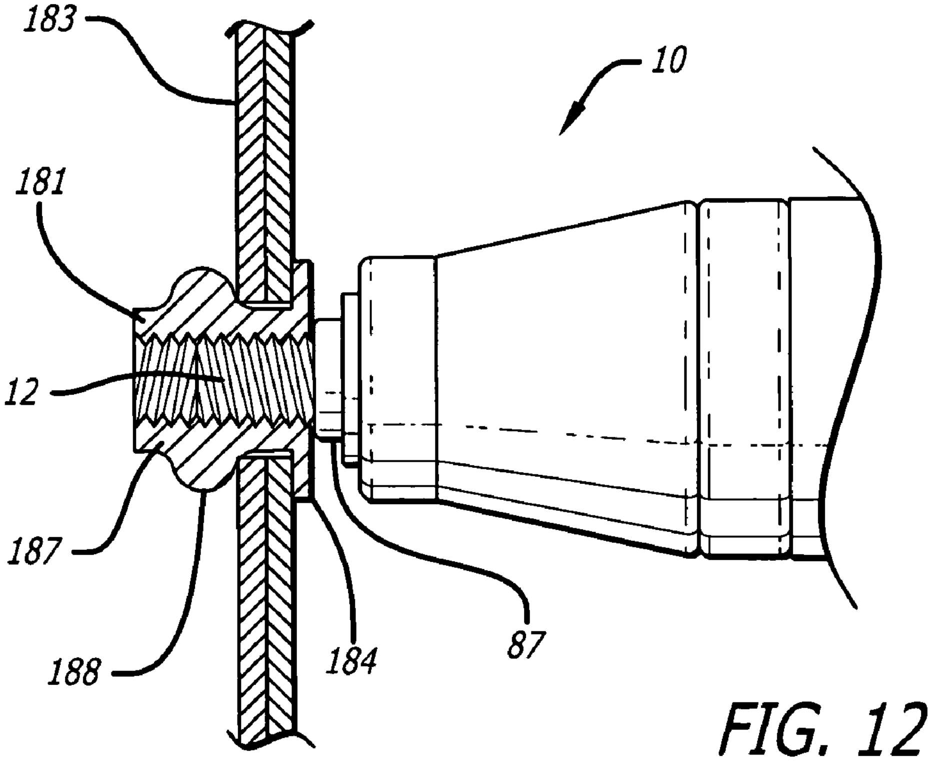

In operation, as seen in FIG. 11, the air motor (not shown) in tool 10 thus stalls or stops turning when flange 184 hits nose piece 87. The trigger signal line 16 detects the stall of the air motor due to an increase in air pressure. That is, the air pressure goes up due to the trigger valve 263 (FIG. 3) coupled to fitting 100 via line 267 (and, thus, to trigger line 16). A signal is sent from trigger valve 263 (FIG. 8) via line 270 to main four-way valve 230. Main valve 230 turns on and sends air to the air cylinder (not shown) via line 231. This moves the piston (not shown) inside of power booster 229 forwardly, the rod of the piston moving to the left in FIG. 3 or forwardly thus raising the pressure of the hydraulic cylinder 264 which raises the pressure in cylinder 264. At the same time, hydraulic fluid from reservoir 238' to hydraulic cylinder 264 and raises the pressure. The fluid flows out through fitting 96 via line 95 to fitting 53 to tool 10. This moves the piston 28 in tool 10 rearwardly (backward) in FIG. 1 which pulls the fastener 181 (FIG. 11) backwards collapsing the same as seen in FIG. 12. This of course all occurs when trigger 25 is pressed in the "up" position. Trigger 25 is now pressed in the "down" position which threads cap screw 12 out of threaded engagement with fastener 181 shutting off the main valve 230. This causes the piston inside of power booster 229 to move backwardly or the right in FIG. 3 to its original position. This release the hydraulic pressure inside of cylinder 264 and the hydraulic fluid returns to reservoir 238'. This causes the return springs 29, 93 inside of tool 10 to push the piston 28 forwardly or to the left in FIG. 1 when the pressure is released. When the trigger 25 is pushed at bottom, this creates a gap between flange 184 and the nose piece 87 reversing the screw 12 so it unthreads from fastener 181 (FIG. 11).

The operation of the air motor (not shown) in the tool 10 is conventional and the air supply via line 18 activated when the trigger 25 is pressed runs the air motor in forward and reverse directions as is well known in the pneumatic tool art.

In operation, regulator gauge assembly 240 (FIG. 3) is preset to the predetermined hydraulic pressure to be placed on the head cap screw 12 of the tool 10 of FIG. 1 when installing a nut, such as the rivet nut 181 shown in FIGS. 11 and 12. That is, nut 181 is inserted into a hole 182 in a panel 183, the enlarged head 184 thereof abutting against the outer surface 185 of panel 183. Screw 12 is disposed in threading engagement with the inner threaded shank 186 of nut 181. A predetermined torque on screw 12, when installing nut 181, will tell the operator that the nut 181 is properly installed as shown in FIG. 12. That is, the exterior surface 187 bulges up when a predetermined torque is reached when flange 184 hits nose piece 87 forming bulge 188 which deforms up against the panel 183 thus locking nut 181 to panel 183. This torque is preset using regulator gauge 240.

Trigger 25 is thus pressed in the up position actuating the hydraulical gearing mechanism of pistol 10 thereby rotating screw 12. Screw 12 will spin clockwise within nut 181 until it seizes up and the fluid pressure changes internally within pistol 10. The nut shank 186 bulges up against the panel 183 to hold the rivet nut 181 to panel 183. Trigger 25 is now pressed, in the down position, to rotate in a counterclockwise direction to remove the same from nut 181 (see FIG. 12).

Although a particular embodiment of the invention is disclosed, variations thereof may occur to an artisan and the scope of the invention should only be limited by the scope of the appended claims.

What is claimed is:

1. Apparatus for installing a rivet nut having an internally threaded shaft wherein said apparatus includes a power tool containing an air motor for rotational motion and a hydraulic piston and chamber to provide linear or axial motion and a screw adapted to engage the threaded shaft of the nut wherein said power tool rotates said screw in a first direction when actuated, the improvement which comprises:

a) a fluid outlet coupled to said hydraulic chamber coupled to a hydraulic power supply, said power supply being fluidly coupled to said power tool whereby said power supply includes clutchless torque predetermining means for determining when a predetermined torque is placed on said screw, then stalling or stopping said motor and rotation of said screw while continuing to supply air to said motor, said torque predetermining means including means for sensing the air pressure level in the stopped or stalled motor and activating a piston mounted internally of said power tool and delivering hydraulic fluid at a preset pressure to said piston, said piston being movable from a forward position, adapted to rotate said screw in a first direction, and then to a rearward position, adapted to rotate said piston in a direction opposite to said first direction while pulling said screw axially.

2. The apparatus of claim 1 wherein said nut has a flange and said power tool has a nose piece at its forward end through which said screw extends, said torque predetermining means being actuated by stopping or stalling said motor when said nose piece is in engagement with said flange and said predetermined torque is reached.

3. The apparatus of claim 1 wherein said power supply includes air regulator means regulating the amount of air delivered to said tool to activate the tool.

4. The apparatus of claim 1 wherein said power tool includes a rocker trigger, said trigger, when activated in a first position, rotates said screw in said first direction, and, when activated in a second position, rotates said shaft in a direction opposite to said first direction.

5. The apparatus of claim 1 wherein said power supply includes a hydraulic chamber for delivering hydraulic fluid to said power tool.

6. The apparatus of claim 5 wherein said power supply includes a power booster coupled to said hydraulic chamber for selectively admitting hydraulic fluid therein and withdrawing hydraulic fluid therefrom.

7. The apparatus of claim 1 including a trigger valve coupled to said motor activated when said motor reaches said predetermined torque.

* * * * *